United States Patent
Kendall, Jr.

[11] Patent Number: 5,855,062
[45] Date of Patent: Jan. 5, 1999

[54] METHOD AND APPARATUS FOR MANUFACTURING AN INSULATED CONDUCTOR IN METAL TUBING

[76] Inventor: Clarence E. Kendall, Jr., 3827 Wickersham, Houston, Tex. 77027

[21] Appl. No.: 690,719

[22] Filed: Jul. 31, 1996

[51] Int. Cl.⁶ .......................... H01B 13/20; H01B 13/22
[52] U.S. Cl. .................. 29/828; 29/728; 29/234
[58] Field of Search ........................ 29/828, 515, 728, 29/234, DIG. 44, DIG. 81, DIG. 84

[56] References Cited

U.S. PATENT DOCUMENTS

| | | | |
|---|---|---|---|
| 2,359,532 | 10/1944 | Searle | 29/234 |
| 2,823,153 | 2/1958 | Bunnell et al. | 29/728 |
| 2,831,656 | 4/1958 | Grieve | 29/234 X |
| 3,245,139 | 4/1966 | Scolaro | 29/728 X |
| 3,373,244 | 3/1968 | Holland | 29/828 X |
| 3,672,196 | 6/1972 | Levacher et al. | 29/728 X |
| 3,778,878 | 12/1973 | Bindari | 29/728 |
| 4,126,927 | 11/1978 | Woodward et al. | 29/234 X |

*Primary Examiner*—Horace M. Culver
*Attorney, Agent, or Firm*—Fulbright & Jaworski

[57] ABSTRACT

A method and apparatus for making a length of cable including placing a length of pipe forming a closed chamber into a bore hole, placing a length of metal tubing into the pipe, attaching a piston pig to an electrically conductive wire and inserting the pig into the metal tubing and applying a differential pressure to the piston pig for controlling the movement of the pig and conductor through the tubing, and removing the combination of the tubing and wire from the pipe for later use.

24 Claims, 13 Drawing Sheets

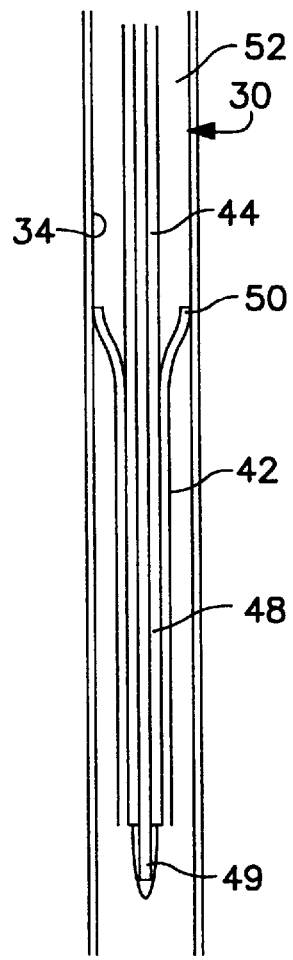
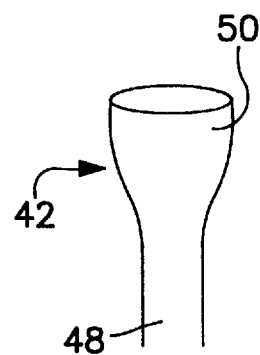
FIG. 3
FIG. 4 us,855,062

METHOD AND APPARATUS FOR MANUFACTURING AN INSULATED CONDUCTOR IN METAL TUBING

BACKGROUND OF THE INVENTION

There is a need for long lengths of an insulated electrical conductor wire encased in metal tubing, for example, in well bores for providing electrical power and/or making various measurements from various types of instruments. In such cases, the electrical cable may be of a long length, for example only, as much as 15,000 feet long. The manufacture of such cable is both expensive and difficult.

The present invention is directed to a method and apparatus for manufacturing long lengths of cable in which an insulated conductor is inserted in a metal tubing. And while the present method and apparatus can be used for manufacturing such a cable in a horizontal position, it is particularly advantageous to manufacture such a cable in a vertical position whereby various types of forces can be utilized such as gravity forces, vacuum forces, and pressure forces, to control the insertion of an insulated conductor into the inside of an outer metal tubing. In addition, in the vertical manufacturing mode, the present method and apparatus can be advantageously utilized in a well bore such as an abandoned oil or gas well thereby reducing the expenses of the manufacturing facilities.

SUMMARY

The present invention is directed to a method of making a length of cable by placing a length of metal tubing in a generally longitudinally extending position and inserting an electrically conductive wire having an insulated cover thereon longitudinally through the metal tubing in which the cover has an outside dimension less than the inside dimension of the metal tubing allowing ease of passageway of the wire through the metal tubing. The method further includes reducing the inside of the dimension of the metal tubing after the wire has been inserted therein at spaced points along the length of the tubing to provide longitudinal support for the wire in the tubing.

The method of the present invention further includes first placing the length of the metal tubing in a generally vertical position and preferably the length of the metal tubing is placed within a generally vertically positioned container.

The method further comprehends wherein the wire is inserted into the tubing by acting on a piston pig connected to the wire with fluid pressure. The wire may be inserted into the tubing and controlled by gravity, positive pressure and/or vacuum pressure.

A further object of the present invention is wherein the container is in communication with and encloses the lower end of the tubing and the pressure in the container and lower end of the tubing is controlled.

Still a further object of the present invention is wherein the wire is inserted in a tubing from a spinning type reel.

Yet a still further object is the provision of forming a plurality of spaced curves in the tubing for supporting a vertically extending conductive wire being inserted into the tubing.

Still a further object of the present invention is the method of making a length of cable which includes placing a length of pipe having a closed end and an open end in a generally vertical bore hole with the closed end downwardly, placing a length of metal tubing having a lower end and an upper end into the pipe and supporting the tubing therein from adjacent its upper end, sealing between the upper end of the tubing and the open end of the pipe and closing the upper end of the pipe, providing an air communication from the lower end of the tubing through an annulus between the tubing and the pipe and to the exterior of the pipe. The method further includes attaching a piston pig to an electrically conductive wire having an insulated cover thereon in which the cover has an outside dimension less than the inside dimension of the metal tubing and inserting the piston plug into the metal tubing and applying a positive pressure to the upper end of the tubing pushing the pig and the wire downwardly through the metal tubing until the pig moves to the lower end of the metal tubing pulling the wire through the tubing, and removing the combination of the metal tubing and the insulated wire from the pipe for later use. The method further includes applying a vacuum pressure through the air communication to the lower end of the tubing to the piston plug and/or providing a positive pressure through the air communication to the lower end of a tubing to the piston pig.

A further object of the present invention is the provision of an apparatus for making a length of cable comprising a generally longitudinally extending container having an inside, a closed first end and an open second end with a length of metal tubing longitudinally extending in the inside of the container in which the tubing has an outside of a size less than the size of the container inside and having open first and second ends. A length of electrically conductive wire having an insulated cover thereon in which the cover has an outside size less than the size of the inside of the tubing is provided with at least one piston pig connected to the wire for assisting and moving the pig and the wire through the inside of the tubing by a differential fluid pressure. Fluid pressure means is connected to the container for applying fluid pressure to the pig. Preferably, the container is positioned generally vertically and is preferably a pipe positioned in a well bore. Curved sections may be provided in the metal tubing for supporting long lengths of vertically extending wire therein. An indentator may be positioned outside of the container for indenting the outside of the metal tubing to provide support for the wire in the tubing after manufacture. The fluid pressure means may be a vacuum pump and/or a positive pressure pump.

Yet a still further object of the present invention is the provision of a spinning type reel initially supporting the wire as it is inserted into the tubing and preferably the spinning reel is enclosed in a pressurized chamber.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 3 is an elevational view in cross section of a piston pig connected to an insulated wire and being moved through the inside of a metal tubing, FIG. 4 is a perspective elevational view of a portion of the piston pig.

DESCRIPTION OF THE PREFERRED EMBODIMENT

The method of making a length of cable according to the present invention can be utilized by placing a length of metal tubing in a generally longitudinally extending horizontal position and inserting an electrically conductive wire through the metal tubing by a differential air pressure acting upon one or more pistons in the metal tubing connected to the wire. However, the preferred embodiment of the present invention advantageously is directed to manufacturing the cable in a generally vertical position for reducing damage to the wire conductor while being inserted in the well tubing and to provide additional ways to control the passage of the conductor wire through the metal tubing.

Figure 1:
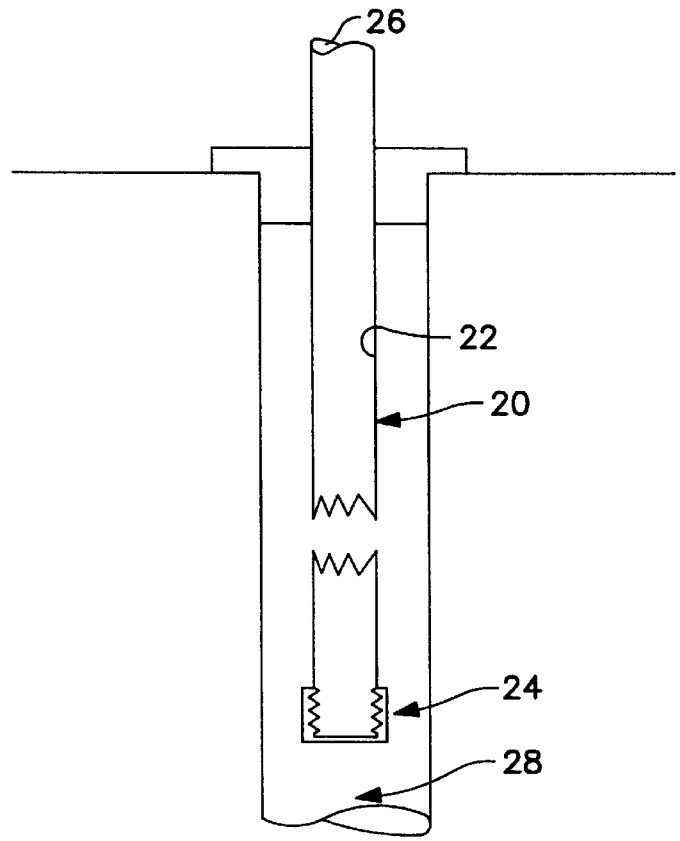
FIG. 1 is an elevational fragmentary view of one step of the manufacture in which a pipe is inserted into a well bore.

The present invention is directed to a method and apparatus for making a long length of cable having an insulated conductor wire in a metal tubing so that long lengths of cable, for example, up to 15,000 feet long may be manufactured. Referring now to FIG. 1, a generally longitudinally extending container such as a pipe 20 having an inside 22, a closed first end such as by cap 24, and an open second end 26 is provided preferably positioned in a well bore 28. The pipe 20 provides a means to keep the manufacturing process at least as straight as the pipe 20 and provides a relatively smooth and clean environment. Also the pipe 20 provides a closed container for controlling air pressure therein for reasons that will be more fully discussed hereinafter. The length of the pipe 20 used establishes the maximum length of the cable which is to be manufactured.

Figure 2:
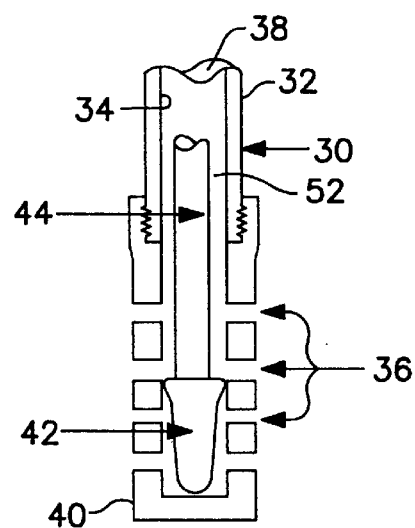
FIG. 2 is a fragmentary elevational view of an insulated conductor inserted into a metal tubing.

Referring now to FIG. 2, a metal tubing 30 is provided of a length corresponding to the length of cable desired to be manufactured and is longitudinally inserted into the inside 22 of the pipe 20, as will be more fully described hereinafter. The tubing 30 has an outside 32, an inside 34, an open first end consisting of a plurality of vents 36 and an open second end 38. Preferably, a piston pig catcher 40 is connected to the lower end of the tubing 30 to prevent a piston pig 42 which is connected to an insulated conductor wire 44 from extending out of the bottom of the metal tubing 30 and inadvertently catching on something when the tubing 30 is removed from the pipe 20 as will be more fully discussed hereinafter. For example only, the pipe 20 may have an inside diameter 22 of approximately two inches, and the outside diameter 32 of the metallic tubing 30 may be approximately one-quarter of an inch thereby providing an annulus 46 (FIG. 6) when the tubing 30 is inserted into the pipe 20.

Referring to FIGS. 2, 3 and 4, one or more piston pigs 42 are provided connected to a conductor wire 44 having an insulated cover to provide a piston which is movable in the metal tubing 30 in response to a differential pressure across the piston 42. While any suitable piston pig may be provided, in one embodiment a length of heat shrink plastic tubing 48 is placed over the insulated conductor wire 44 and heat shrunk thereon while a portion 50 is left unshrunk to provide a skirt to be acted upon by air pressure, but will be flexible so as not to provide sufficient friction to deter its travel along the inside 34 of the tubing 30. Preferably, the wire of conductor 44 is bent and dipped in a molten lead to provide a nose 49 to support the pig 42.

It is to be noted from FIGS. 2 and 3, that the insulated conductor wire, which may be any conductive wire or wires, such as copper, steel or aluminum, covered by any suitable insulator, is of a length generally matching the length of the metal tubing 30 inserted into the pipe 20. The cover of the conductor wire has an outside diameter less than the inside diameter 34 of the metal tubing 30 whereby the conductor 34 may be easily moved and inserted through the metal tubing 30, and provide an annulus 52 therebetween.

Figure 5:
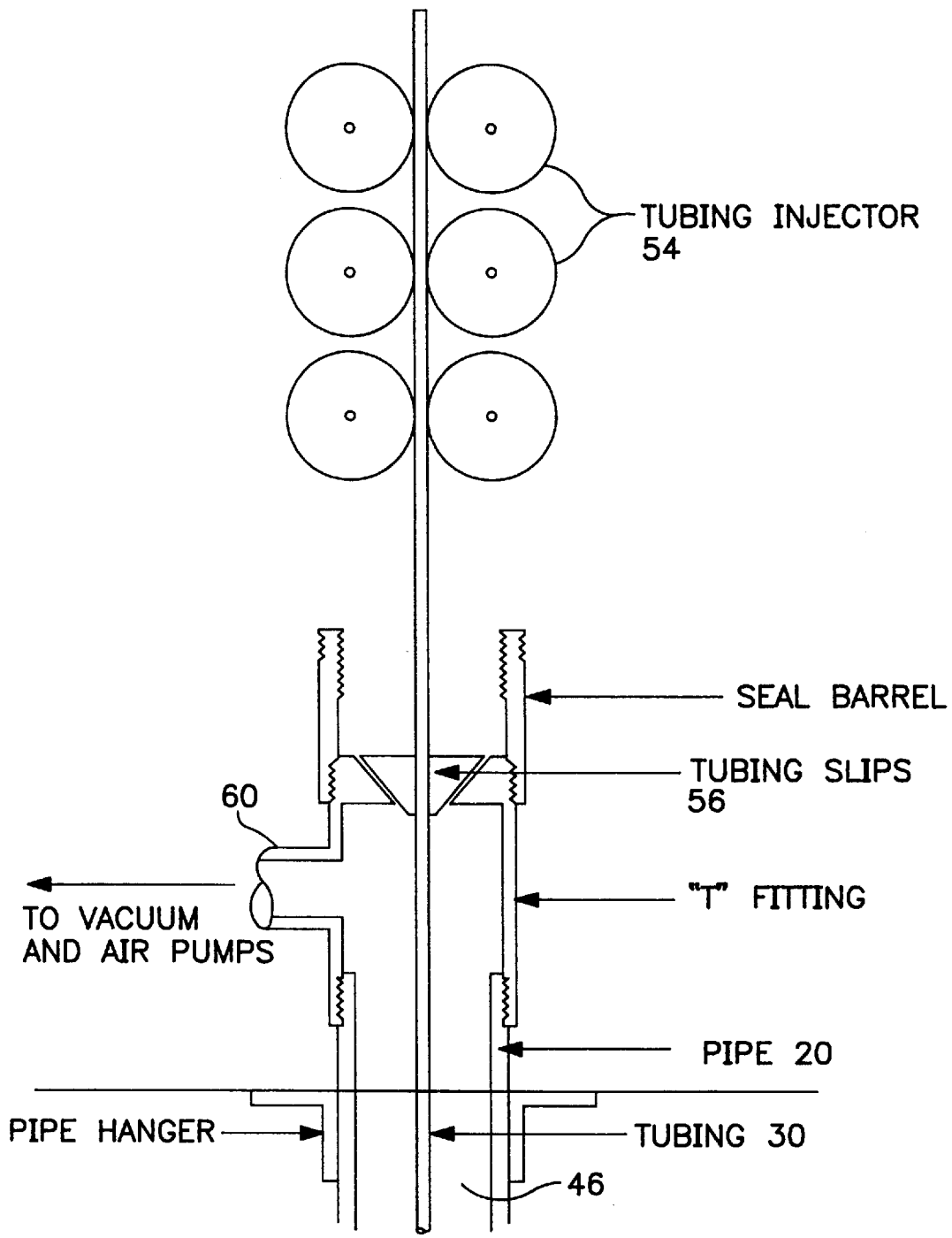
FIG. 5 is a schematic elevational view illustrating the step of the metal tubing being longitudinally inserted into a pipe.
Figure 6:
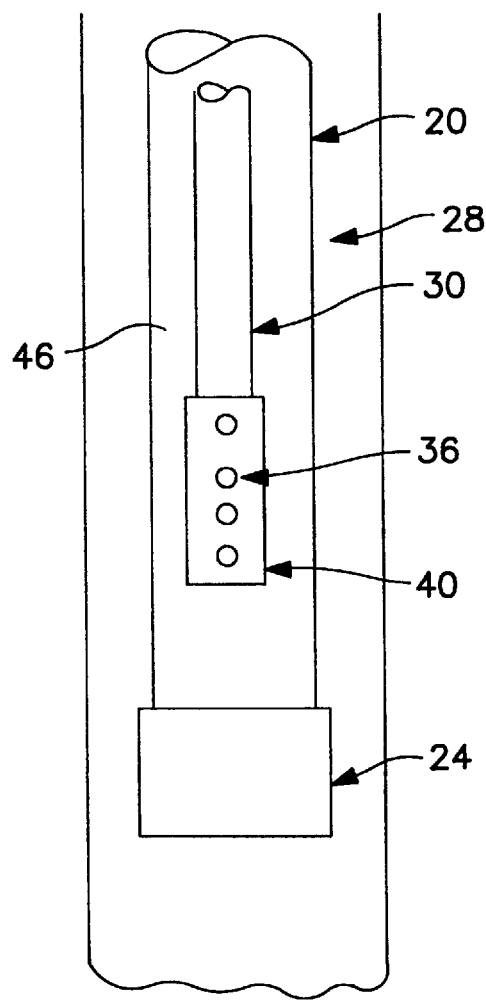
FIG. 6 is a fragmentary elevational view, in cross section, of the lower end of the metal tubing positioned in a pipe which in turn is positioned in a well bore.
Figure 7:
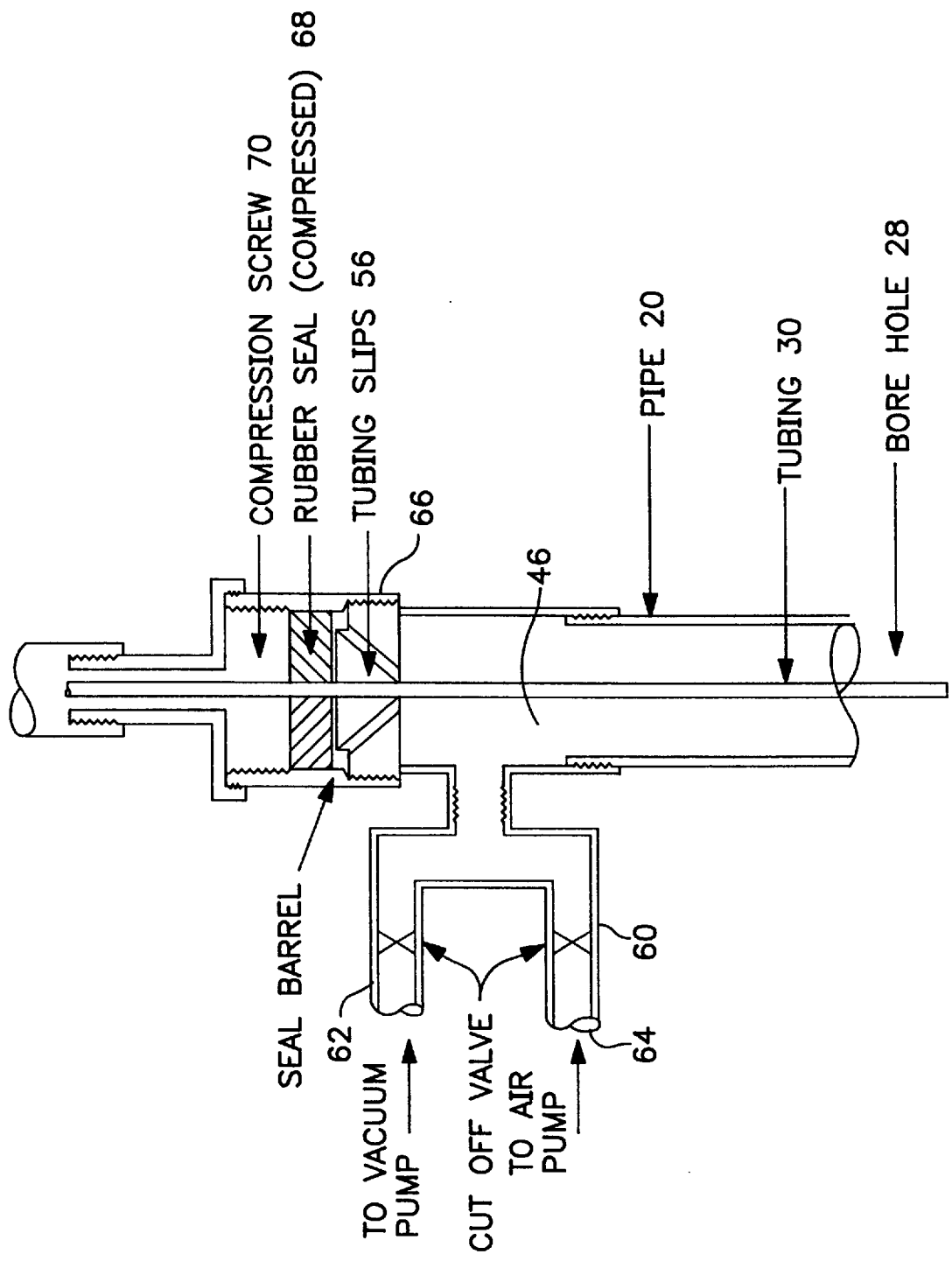
FIG. 7 is a fragmentary elevational schematic elevational view, in cross section, of the pipe assembly at the wellhead.

After the pipe 20 is put into place, as best seen in FIG. 1, the tubing 30 is longitudinally inserted through the pipe 20, as best seen in FIGS. 5 and 6, in which a conventional tubing injector 54 is used to longitudinally extend the tubing 30 downwardly through the pipe 20 to the position shown in FIG. 6, and conventional tubing slips 56 are provided to support the downwardly extending tubing 30. In FIG. 5, a fluid pressure means 60 is provided in communication with the inside of the pipe 20 and in the annulus between the pipe 20 and the tubing 30 and thus in communication with the vents 36 (FIGS. 2 and 6) in communication with the lower end of the inside of the tubing 30. As best seen in FIG. 7, the pressure means 60 may include a vacuum connection 62 to a vacuum pump for supplying a vacuum to the annulus 46 as well as a pressure connection 64 which can supply a positive pressure to the annulus 46 and thus to the inside of the bottom of the tubing 30. Thus, either a vacuum pressure or a positive pressure may be applied to the annulus 46 and thus to the lower end of the tubing 30 to act against one or more piston pigs 42 to control the dissent of the piston pigs 42 and the conductor wire 44 downwardly into the tubing 30.

Also referring to FIG. 7, after the pipe 20 and the tubing 30 have been installed, the pipe head assembly 66 is completed to provide a seal 68 between the pipe 20 and the tubing 30 in which the seal is actuated by a compression screw 70.

Figure 8:
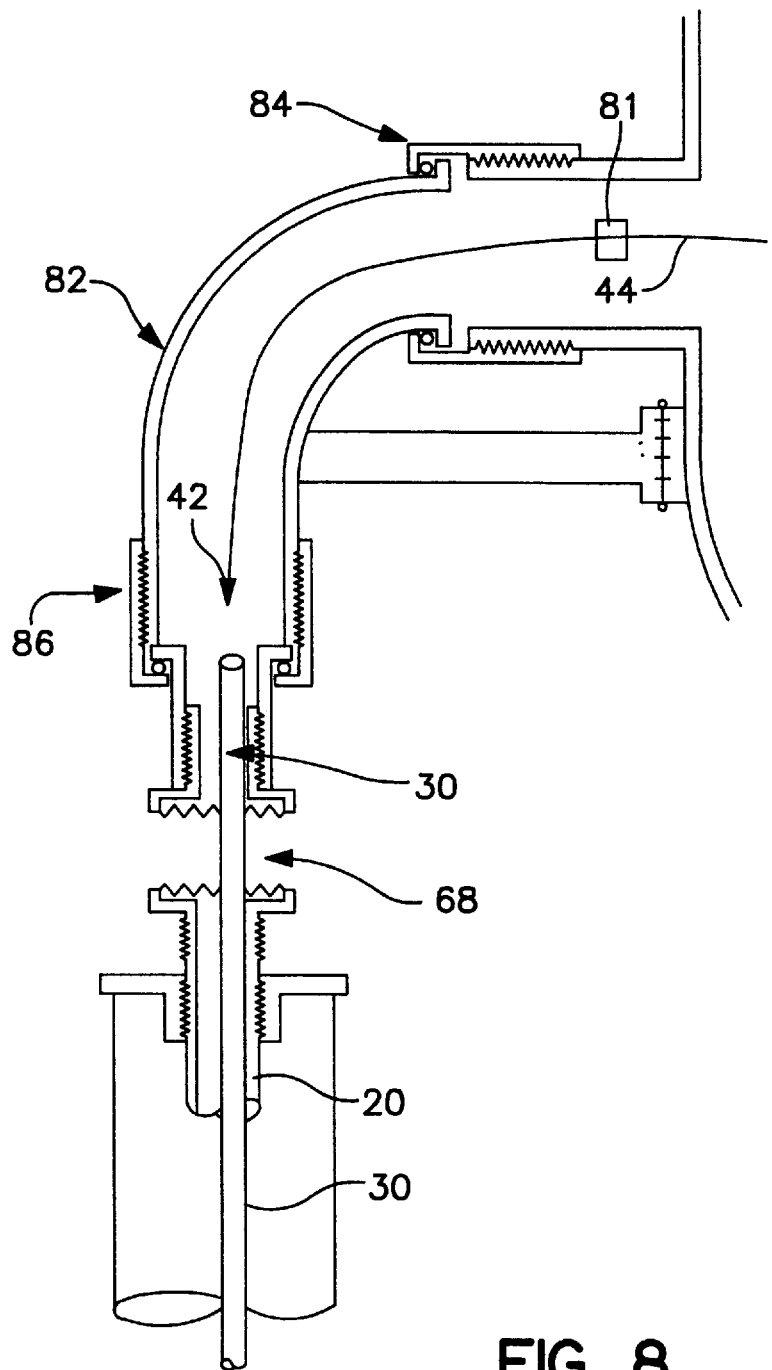
FIG. 8 is a schematic elevational view, partly in cross section, illustrating a conductor wire being inserted into the metal tubing at the wellhead.
Figure 9:
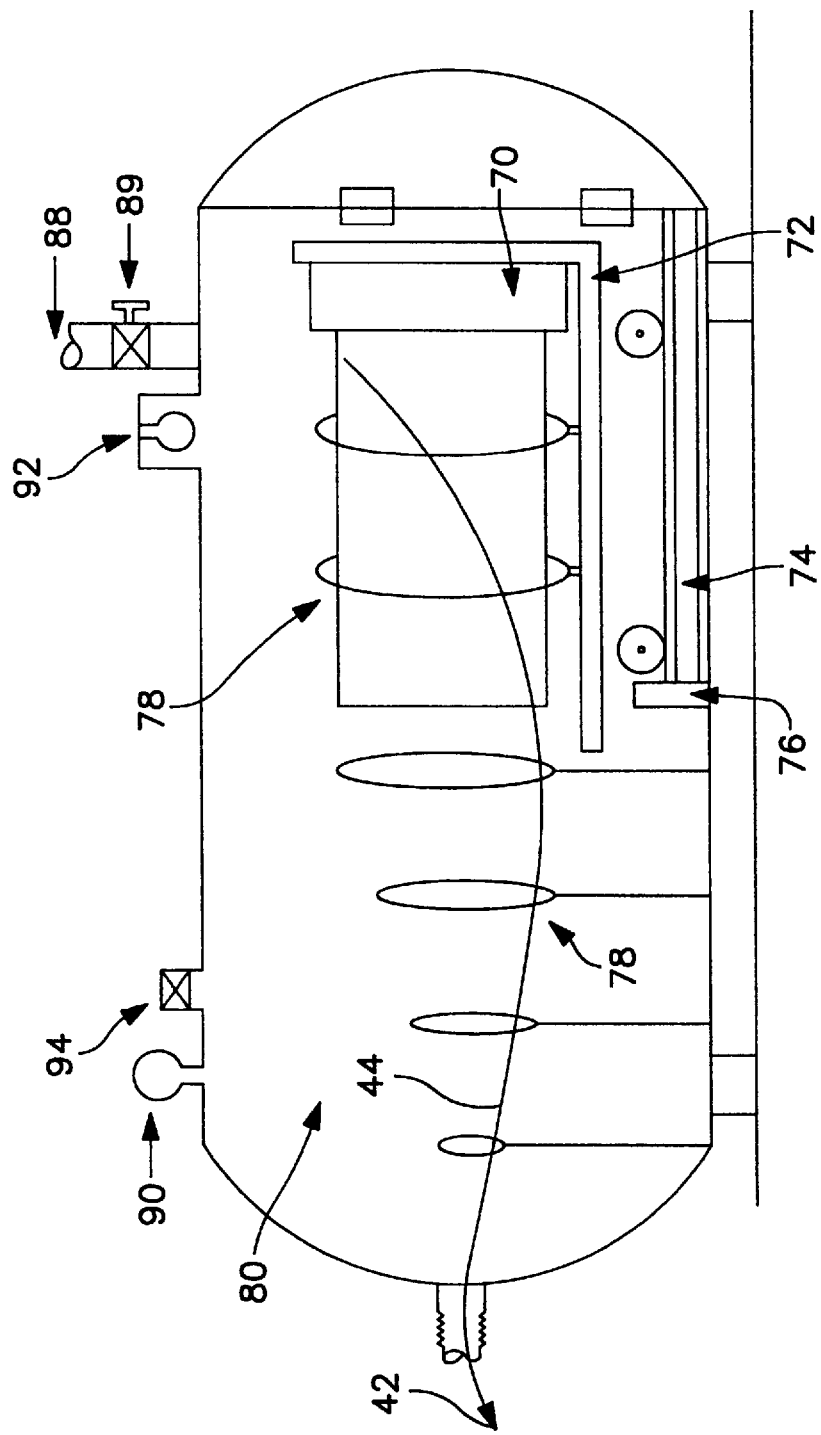
FIG. 9 is a schematic elevational view of a spinning type reel containing the insulated wire conductor positioned in a pressure chamber.

The insulated conductor wire 44, as best seen in FIGS. 8 and 9, is preferably unwind from a shipping reel and rewound onto a spinning reel 70 which in turn is mounted on a reel cart 72 which can be rolled on tracks 74 and against a stop 76. A plurality of guide loops 78 are provided to support the insulated conductor wire 44 (FIG. 9) in which the wire 44 and piston pig 42 are to be inserted into the tubing 30 (FIG. 8). While the reel 70 may be a conventional type reel, the spinning reel 70 eliminates the need for controlling the revolutions per minute which will be required if a common reel were used. With a spinning reel 70, the only energy needed is that necessary to pull from the reel 70 one loop of conductor wire 44. In addition, it is preferred that a positive air pressure be applied to the top of any piston pigs 42 connected to the conductor 44 as they are inserted into the tubing 30. Therefore, it is desirable that the spinning reel 70 be enclosed in a pressure chamber 80 having a gooseneck connection 82 leading to the pipe head assembly 38. The gooseneck 82 may be connected and disconnected by a top collar 44 and a bottom collar 86 to position the piston pig 42 into the top of the tubing 30. The chamber 80 is connected to a compressed air intake 88, valve 89, a pressure gauge 90, a light 92, a relief valve 94, and viewing port 95. A sensor 81 in the chamber 80 can measure markings on the conductor wire 44 and can transmit the rate of speed and length unwound for use in determining and controlling the rate of descent of the conductor wire 44.

Figure 10:
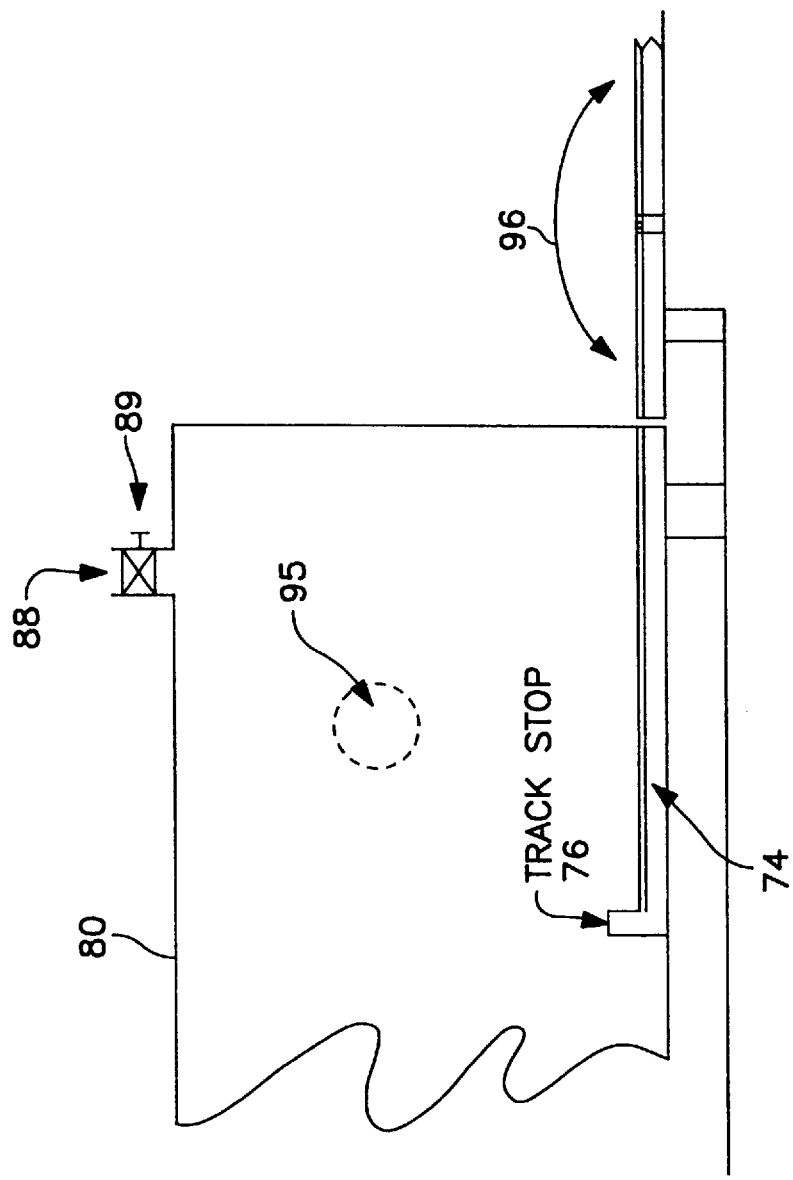
FIG. 10 is a fragmentary schematic elevational view illustrating a track system for loading a wire reel into a pressurized chamber.

FIG. 10 is a view showing the chamber 80 with an external movable track segment 96 connected to the track 74 in the chamber 80 so that the reel cart 72 may be moved into the chamber 80.

Figure 11:
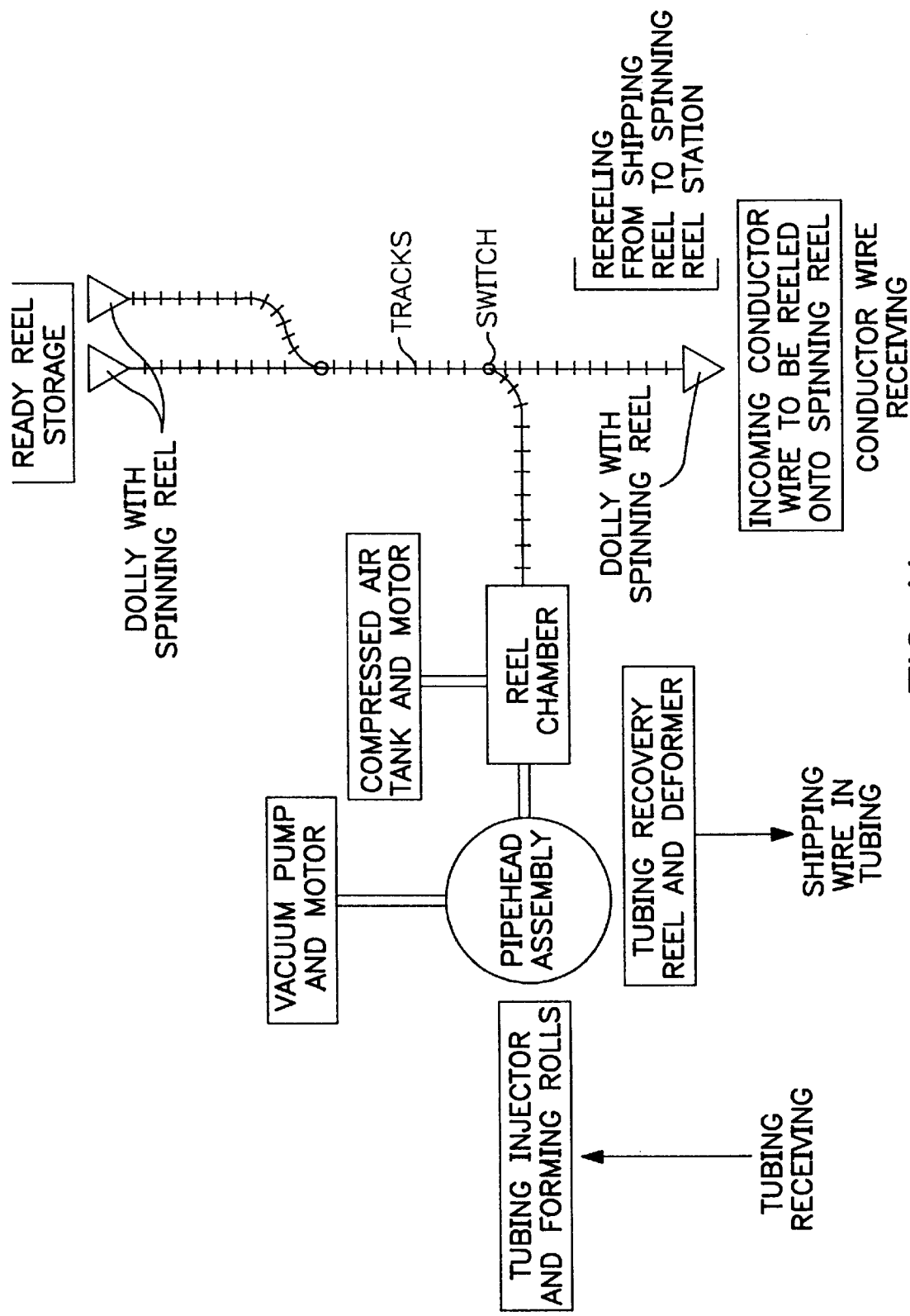
FIG. 11 is a schematic block diagram illustrating the interrelationship of various components of the present invention.

Referring now to FIG. 11, a schematic layout of equipment is shown so that labor in performing the method of the present invention is reduced.

To activate the system after the pipe 20 and the tubing 30 have been installed, and the conductor wire reel 70 has been placed in the chamber 80 and the piston pig 42 has been inserted into the upper end of the tubing 30, the vacuum line 62 (FIG. 7) is energized so as to create a vacuum inside of the annulus 46 and inside of the bottom vents 36 of the tubing 30. The reason for creating the vacuum is to remove the air column in the tubing 30 and the pipe 20 which would otherwise offer resistance to the downward movement of the piston pig 42 in the inside of the tubing 30. After a vacuum has been created, air pressure in the reel chamber 80 is increased. When sufficient pressure is reached (depending upon the sizes of the tubing 30, the conductor wire 44 to be inserted and the reel chamber 80) the valve 89 is opened to increase the air pressure gradually in the reel chamber 80. The positive air pressure will be applied to the top of the tubing 30 and against the top of the piston pig 42 and move the pig 42 downwardly. The combination of the positive pressure above the pig 42, the low pressure below the pig 42, and the weight of the conductor wire 44, which has been pulled into the tubing 30, will cause the pig 42 and the conductor wire 44 to move downwardly inside of the tubing 30.

However, the combination of high pressure above the pig 42, the low pressure below the pig 42 and the weight of the conductor wire 54 may cause the pig 42 and conductor wire 44 to travel too fast. This in turn could cause stress or breakage of the conductor wire 44. Therefore, in order to control the speed of travel of the pig 42 and conductor wire 44 in the tubing 44, the vacuum supply in connection 62 may be shut off and air is permitted to enter to the inside of the pipe 20 and the lower end of the tubing 30, and/or the valve 89 (FIGS. 9 and 10) may be closed shutting off the compressor intake 88 and compressed air in the reel chamber 80 is released so there will be no air pressure on top of the pig 42. Additionally, positive pressure may be applied from the positive pressure inlet connection 64 (FIG. 7) to the inside of the pipe 20 and the bottom of the tubing 30 to the underside of the piston pig 42. Air will then travel into the pipe 20 and the lower end of the tubing 30 and this upward air pressure in the tubing 30 acting against the pig 42 will lessen or slow the descent of the pig 42 and conductor wire 44.

However, where the length of the tubing 30, into which the conductor wire 44 has been inserted, is so long that the conductor wire 44 cannot support itself, it may break unless support is provided. The support problem is two-fold: first, the conductor wire 44 must be supported while it is being inserted into the tubing 30 and, second, it must be supported after it has been inserted into the tubing and subsequently, when the tubing 30 is later used.

Figure 12:
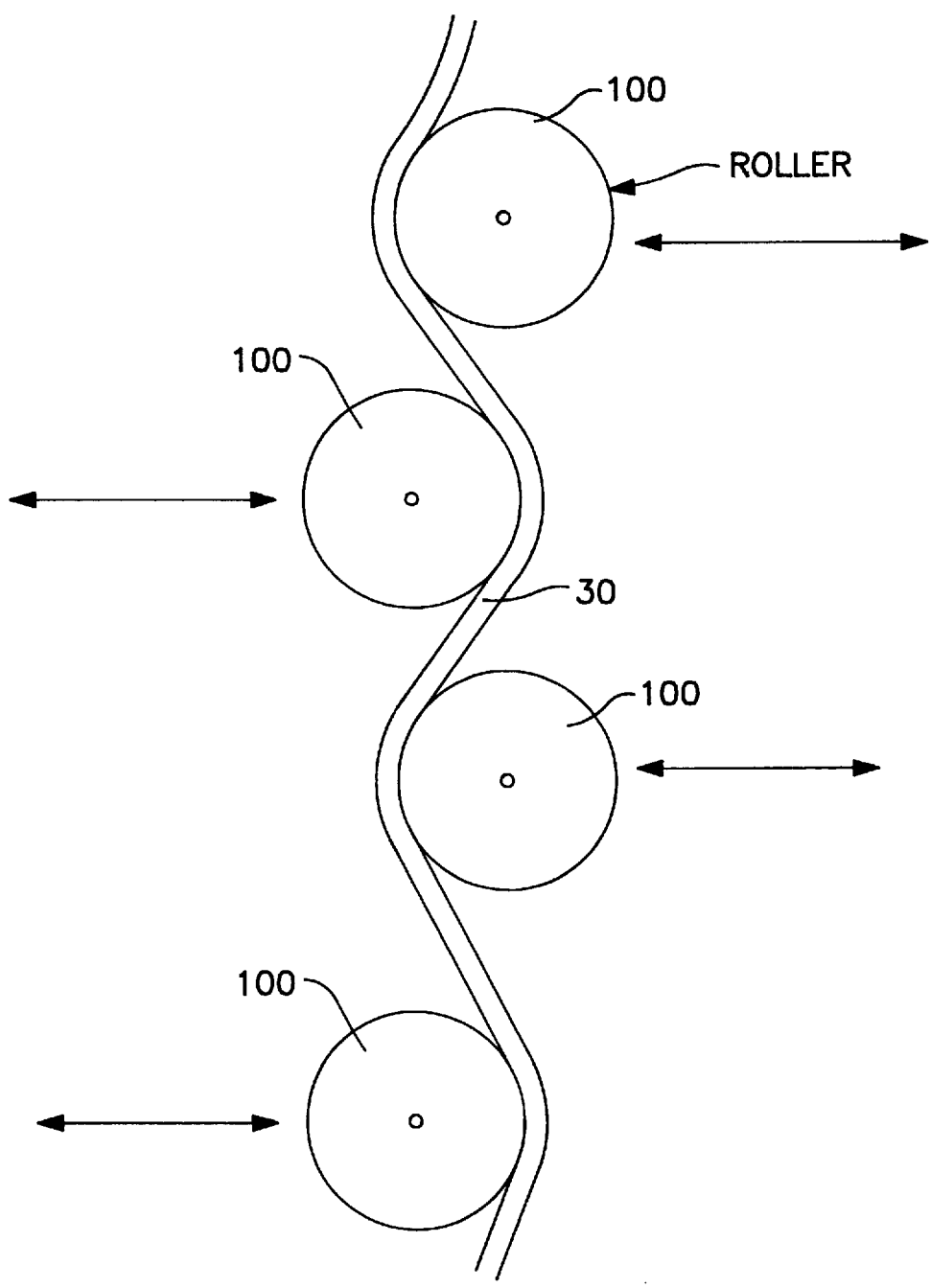
FIG. 12 is a schematic elevational view illustrating an apparatus for forming one type of curve in a metal tubing.
Figure 13:
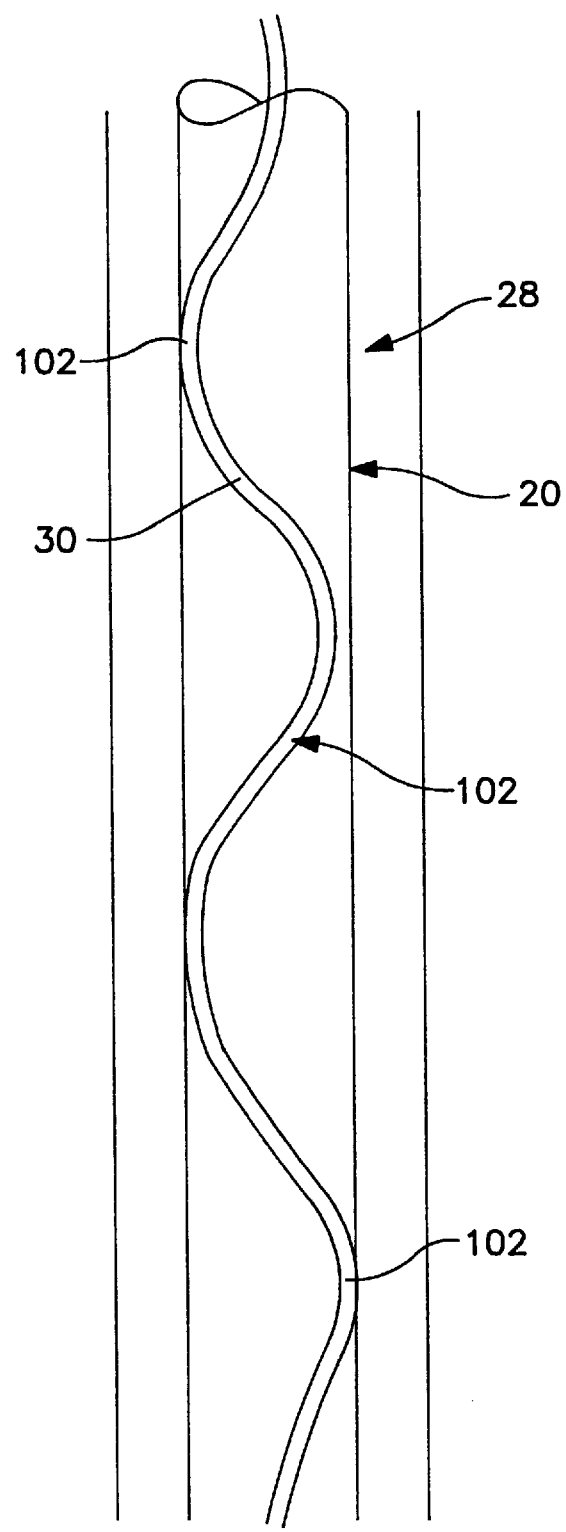
FIG. 13 is a fragmentary elevational view of a curved portion of a metal tubing in a pipe in a well bore.

If the conductor wire 44 is not able to support itself at the required length, before the tubing 30 is inserted into the pipe 20, it is provided with a spaced series of curves such as helical or "S" curves to supply lateral support to the inserted conductor 44. For example, the tubing 30 may be passed through a series of forming rolls 100 (FIG. 12) which will bend the tubing 30 into a series of "S" curves 102 (FIG. 13). The forming rolls 100 are retractable so to make the "S" type curves 102 at periodic intervals while the tubing 30 is being inserted into the pipe 20. The amount of curvature created by the rolls 100 is such that the distance separating the outermost point of a curve does not exceed the length of the radius of the pipe 20. The purpose of the periodic curves in the tubing 30 is to create friction points between the surface of the conductor wire 44 and the internal surface of the tubing 30 which will support the conductor wire while it is being inserted into the tubing 30 as well as when the tubing is reeled out of the pipe 20.

Figure 14:
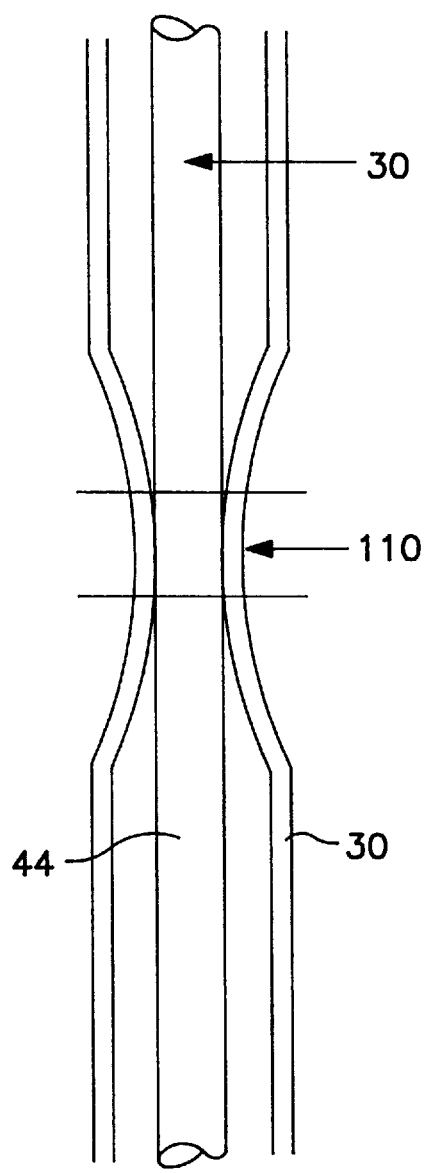
FIG. 14 is a fragmentary elevational view, in cross section, illustrating an indentation in a metal tubing for supplying a support for an electrical insulated conductor therein.
Figure 15:
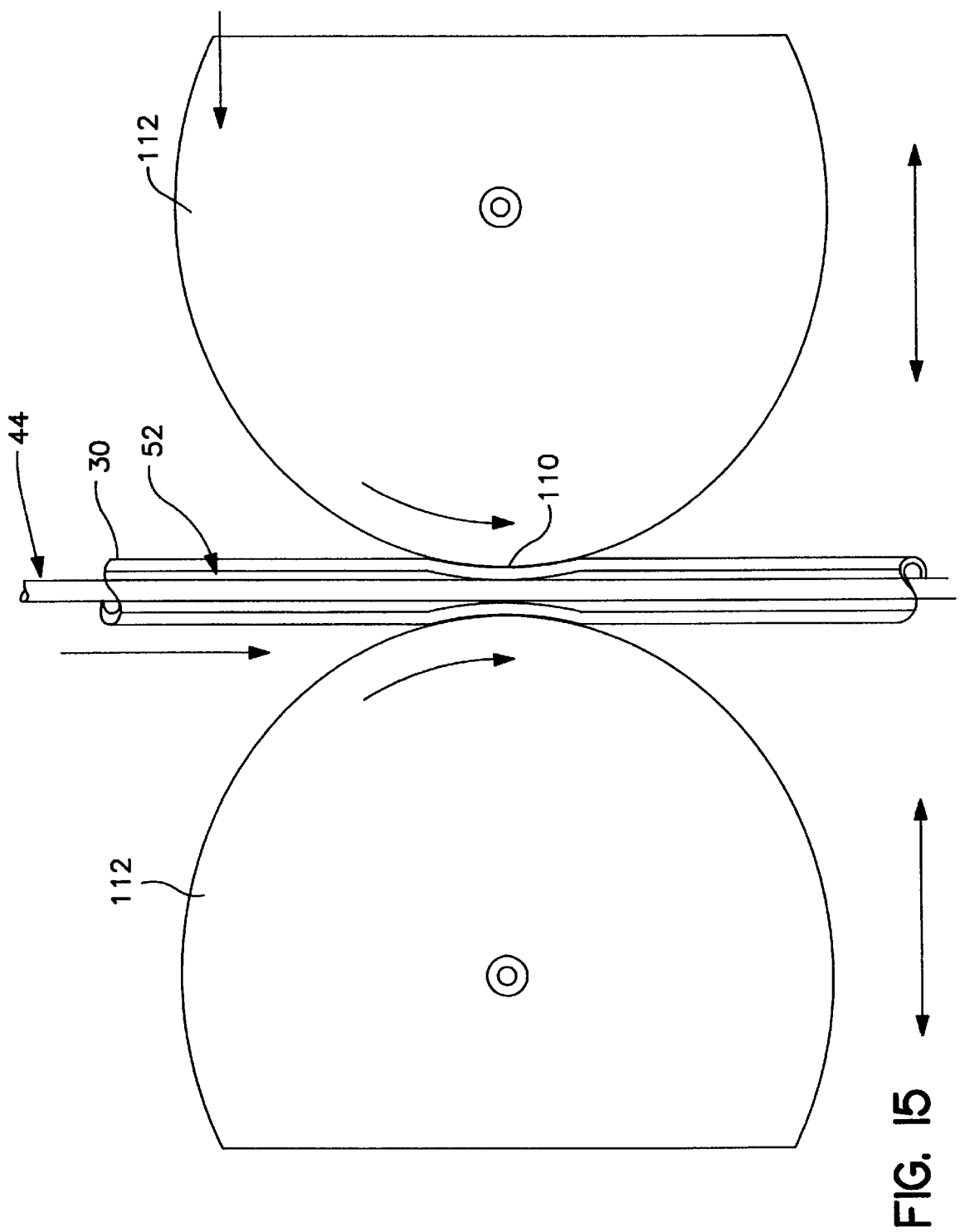
FIG. 15 is a schematic elevational view of one form of apparatus for providing the indentation in FIG. 14.

After the conductor wire 44 has been inserted through the length of tubing 30, the tubing 30 and enclosed conductor wire 44 is removed from the pipe 20 and wound on a shipping reel. However, for long lengths of cable, a means of supporting the wire 44 in the tubing 30 must be provided when the cable is later used in long vertical positions such as a well bore for logging purposes. Suitable support means may be provided by indentations or deforming the outside of the tubing 30 with indentations 110, such as shown in FIG. 14, which may be made by opposed eccentric rolls 112 as shown in FIG. 15. The indentations 110 would be made and applied to the tubing 30 as it is withdrawn from the pipe 20 before it is wound on a shipping reel. Each opposed roll 112 will be set to provide maximum deformation equal to the width of the annulus 52 less an amount which will permit the conductor wire 44 to move freely if exactly centered in the tubing 30. Otherwise, the elliptical shape of the deformed tubing 30 at indentations 110 will create a friction point which in the event of lateral movement and this will support the conductor wire 44 because it will rarely hang straight in the tubing 30. Similarly, any curves in a well bore in which the cable is used will prevent the cable from hanging straight. This feature also permits the tubing 30 to be reeled out of the pipe 20 without undue stress on the conductor wire 44.

The spacing or intervals between the "S" curves 102 (FIG. 13) and the intervals between the deformations or indentations 110 (FIG. 14) of the tubing 30 and the amount of deformation depends upon the gauge, metallurgy and strength of the conductor wire 44 and its insulation.

The present invention, therefore, is well adapted to carry out the objects and attain the ends and advantages mentioned as well as others inherent therein. While a presently preferred embodiment of the invention has been given for the purpose of disclosure, numerous changes in the details of construction, arrangement of parts, and steps of the method, will be readily apparent to those skilled in the art, and which are encompassed within the spirit of the invention, and the scope of the appended claims.

What is claimed is:

1. The method of making a length of cable comprising, placing a length of pipe having a closed end and an open end, in a generally vertical position with the closed end downwardly, placing a length of metal tubing in a generally longitudinally extending position into the pipe, inserting an electrically conductive wire having an insulated cover thereon longitudinally through the metal tubing in which the cover has an outside dimension less than the inside dimension of the metal tubing wherein the wire is inserted into the tubing by acting on a piston pig connected to the wire with fluid pressure and by gravity, and reducing the inside dimension of the metal tubing after the wire has been inserted in the tubing at spaced points along the length of the tubing to provide longitudinal support for the wire.

2. The method of claim 1 wherein the pipe is in communication with and encloses a lower end of the tubing, and controlling the pressure in the pipe and the lower end of the tubing.

3. The method of claim 1 including, inserting the wire into the tubing from a spinning type reel.

4. The method of claim 1 wherein positive pressure is applied to a side of the piston pig.

5. The method of claim 1 wherein vacuum pressure is applied to a side of the piston pig.

6. The method of claim 1 including forming a plurality of spaced curves in the tubing for supporting a vertically extending conductive wire.

7. The method of making a length of cable comprising, placing a length of pipe having a closed end and an open end, generally in a vertical bore hole with the closed end downwardly, placing a length of metal tubing having a lower end and an upper end into the pipe and supporting the tubing therein from adjacent the upper end, sealing between the upper end of the tubing and the open end of the pipe and closing the open end of the pipe, providing an air communication from the lower end of the tubing through an annulus between the tubing and the pipe and to the exterior of the pipe, attaching a piston pig to an electrically conductive wire having an insulated cover thereon in which the cover has an outside dimension less than the inside dimension of the metal tubing, inserting the piston pig into the metal tubing, and applying a positive pressure to the upper end of the metal tubing pushing the pig and the wire downwardly through the metal tubing until the pig moves to the lower end of the metal tubing pulling the wire through the tubing, removing the combination of the metal tubing and the insulated wire from the pipe for later use.

8. The method of claim 7 including, reducing the inside dimension of the metal tubing at spaced points along the length of the tubing to provide longitudinal support for the wire therein.

9. The method of claim 7 including inserting the wire into the tubing from a spinning type reel.

10. The method of claim 7 wherein vacuum pressure is applied through the air communication to the lower end of the tubing to the piston pig.

11. The method of claim 7 wherein positive pressure is applied through the air communication to the lower end of the tubing to the piston pig.

12. The method of claim 7 including forming a plurality of spaced curves in the tubing before inserting the tubing in the pipe for vertically supporting the vertically extending conductive wire inserted therein.

13. An apparatus for making a length of cable comprising, a generally longitudinally extending container having an inside, a closed first end and an open second end, wherein the container is a pipe positioned in a well bore, a length of metal tubing longitudinally extending in the inside of the container, said tubing having an outside of a size less than the size of the container inside, and having open first and second ends, a length of electrically conductive wire having an insulated cover thereon, said cover having an outside size less than the size of the inside of the tubing, at least one piston pig connected to the wire for assisting in moving the pig and wire through the inside of the tubing by a differential fluid pressure, fluid pressure means connected to the container for applying fluid pressure to the pig.

14. The apparatus of claim 13 wherein the container is positioned generally vertical.

15. The apparatus of claim 14 including, curved sections in the metal tubing for supporting a vertically extending wire therein.

16. The apparatus of claim 13 including, an indentation means positioned outside the container for indenting the outside of the metal tubing to provide support for the wire in the tubing.

17. The apparatus of claim 13 including, an air pump connected to the container for creating an air pressure in the metal tubing.

18. The apparatus of claim 17 wherein the air pump is a vacuum pump.

19. The apparatus of claim 17 wherein the air pump is a positive pressure pump.

20. The apparatus of claim 13 including, a spinning type reel initially supporting the wire as it is inserted into the tubing.

21. The apparatus of claim 20 wherein the reel is enclosed in a pressurized chamber.

22. The apparatus of claim 13 including, an air pump connected to the second end of the metal tubing for moving the pig and wire into the tubing.

23. The apparatus of claim 13 wherein the metal tubing includes a pig catcher at the first end of the tubing.

24. The apparatus of claim 13 wherein the piston pig includes a heat shrunk plastic tube covering the insulated cover with the top end being unshrunk providing a flexible skirt.

* * * * *